P. J. PARKER 3,378,762

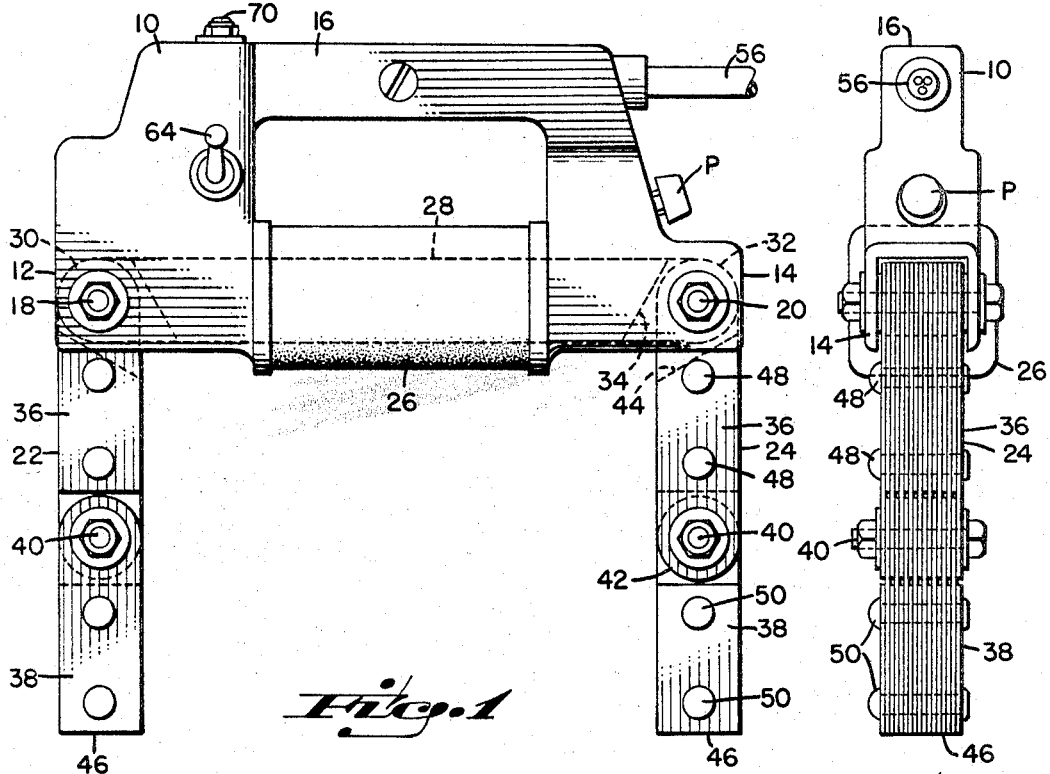
Fig. 1
Fig. 2
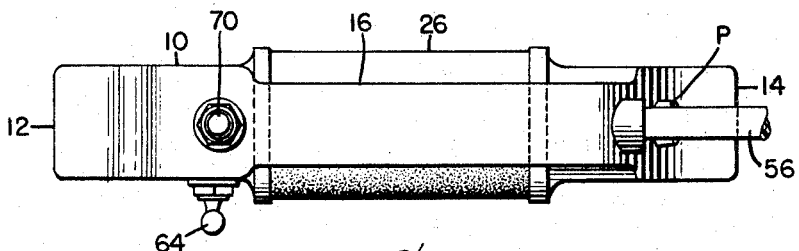
Fig. 3
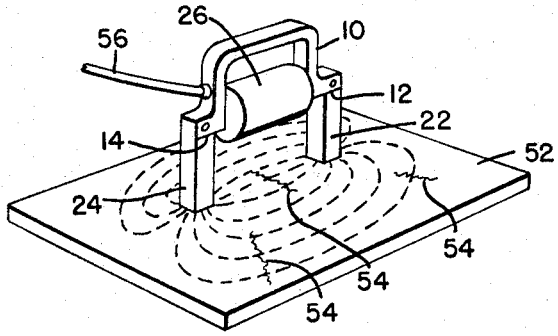
Fig. 4
INVENTOR.
PHILLIP J. PARKER
ATTORNEY April 16, 1968

MAGNETIC PARTICLE INSPECTION PROBE WITH ADJUSTABLE PROBE LEGS
AND SELF-CONTAINED CIRCUITRY FOR A.C. OR D.C. TESTING

Original Filed Sept. 2, 1964

INVENTOR.
PHILLIP J. PARKER

BY *J. Warren Finney, Jr.*

ATTORNEY

United States Patent Office

3,378,762
Patented Apr. 16, 1968

3,378,762
MAGNETIC PARTICLE INSPECTION PROBE WITH ADJUSTABLE PROBE LEGS AND SELF-CONTAINED CIRCUITRY FOR A.C. OR D.C. TESTING
Phillip J. Parker, 1714 Santa Anna Drive, Dunedin, Fla. 33528
Continuation of application Ser. No. 394,028, Sept. 2, 1964. This application July 5, 1967, Ser. No. 651,321
8 Claims. (Cl. 324—38)

This is a continuation of application Ser. No. 394,028, filed Sept. 2, 1964.

The present invention relates to a contour probe, or device for revealing surface or near subsurface defects such as cracks or foreign substances in magnetizable ferrous objects or materials. Such cracks or defects are often not detectible by visual inspection, and must therefore be discovered by other means of greater effectiveness.

One means of detection, or inspection, comprises creating a magnetic field in the ferrous object to be tested, and applying to the magnetized area a quantity of minute metal particles such as fine iron filings. If a defect is present in the magnetized area, the locale of the defect will so attract the metal particles as to outline the defect. This method is known as the magnetic particle inspection method of non-destructive testing.

An object of the present invention is to improve the technique of testing by the magnetic particle inspection method, and to improve the apparatus used in performing the method.

Another object of the invention is to enlarge the scope of testing by means of an electro-mechanical probe of improved construction.

A further object is to provide an improved probe for detecting defects with the use of alternatively selectible means built into the probe, whereby to enhance the effectiveness and the scope of use under various test conditions.

Another object is to provide a testing probe of the character stated, which lends itself to detecting flaws or defects in objects which may be quite irregular of contour, or characterized by offsets, corners, curvatures, and other departures from a relatively simple planar formation.

The foregoing and other objects are attained by the means described herein and illustrated upon the accompanying drawings, in which:

FIG. 1 is a side elevational view of the improved contour probe employing the present invention.

FIG. 2 is an end elevation of the same.

FIG. 3 is a top plan view of the same.

FIG. 4 is a perspective view showing a defective ferrous article undergoing testing for flaws.

Figure 5:
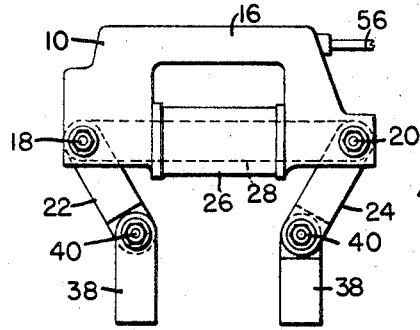
FIG. 5 is a side elevation of the contour probe, in one position of adjustment.
Figure 6:
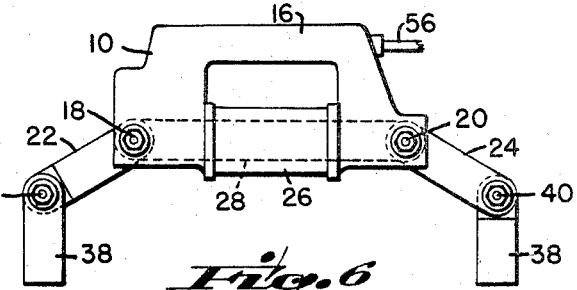
FIG. 6 is a similar view showing a seocnd adjusted position.
Figure 7:
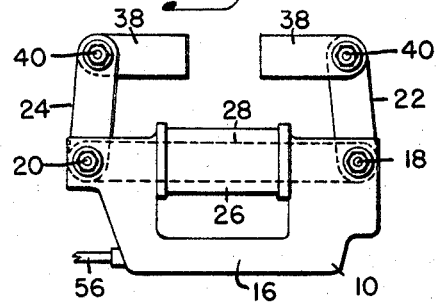
FIG. 7 is a similar view showing a third adjusted position.
Figure 8:
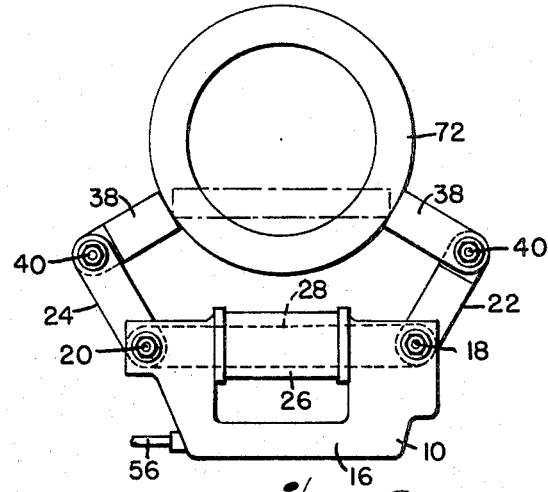
FIG. 8 is a similar view showing the probe in condition for testing a cylinder for defects.

In general, the contour probe may comprise a hollow elongate non-ferrous housing 10 having an inverted U-shaped forward end 12 and an inverted U-shaped rear end 14, connected by means of a handle 16. The ends 12 and 14 may be apertured transversely to receive bolts 18 and 20, respectively, from which may depend the jointed legs 22 and 24. The legs are constructed of magnetic material, such as electrical steel laminations, as will be explained.

Intermediate the forward and rear ends 12 and 14 of the housing, and beneath handle 16, is supported an electrical magnetizing coil 26. The coil surrounds an elongate core 28 of magnetizable steel laminations, the core having opposite ends 30 and 32 which are perforated to accommodate the bolts 18 and 20. Bolts 18 and 20 accordingly may be utilized to fix core 28 to housing 10 while the core supports coil 26, and to suspend the jointed legs 22 and 24 from the housing. Upon loosening the nuts of bolts 18 and 20, the jointed legs may be swung to various testing positions, for example as illustrated by FIGS. 5 through 8.

Each core lamination may be in the form of a thin ferrous metal strip having one end rounded off and perforated to receive a bolt such as 18, whereas the opporsite end of the strip terminates in a foreshortened bias-cut end 34. A multiplicity of such strips, arranged in end-to-end alternation, makes up the composite core having perforated opposite ends to receive the bolts 18 and 20.

Leg 24 may comprise an upper section 36 and a lower section 38, pivotally connected by means of a bolt 40 to permit angular disposition of the sections as exemplified by FIGS. 5 through 8. Upper section 36 comprises a multiplicity of thin ferrous metal strips like those of core 28 just described, but shorter in length. Each strip or lamination of section 36 may have a rounded end 42 perforated to receive a bolt, for example bolt 40, and an opposite end terminating as a foreshortened bias-cut end 44. A multiplicity of such strips, arranged in end-to-end alternation, makes up the composite section 36 having perforated opposite ends to receive the bolts 40 and 20. Alternate strips of section 36 fit between alternate strips of core 28, to effect a firm pivotal connection at bolt 20, FIG. 2.

The lower section 38 of leg 24 may be constructed in a manner quite similar to section 36, and as above described, with the exception that the thin metal laminations of section 38 all terminate in a plane forming a free end 46 of leg section 38. The laminations of both sections may be suitably secured as by means of rivets or other fasteners 48 and 50, to unify the components of the sections.

Leg 22 is constructed as above explained, so that the legs 24 and 22 are similar. It will accordingly be understood that by loosening the nuts of bolts 18, 20, 40, 40, the several leg sections may be disposed in various relative positions, some of which are depicted by FIGS. 5 through 8. The sections may be locked in such positions, when desired, by tightening the nuts of bolts 18, 20, 40, 40.

By energizing the coil 26 with either an alternating electric current (A.C.), or a pulsating direct current (D.C.), the free ends of legs 22 and 24 become magnetized and will create a magnetic field as indicated upon FIG. 4, within a ferrous metal plate or object 52 to be tested.

If the plate or object 52 contains cracks or other defects 54 within the area of the magnetic field, a sprinkling of ferrous metal particles or fine iron filings applied to the area will be attracted to the defects, and thereby clearly outline them. Movement of the particles toward the defects is of course expedited by vibrations imposed upon object 52 by the alternating or pulsing character of the current used in energizing coil 26.

In the several drawing views, the reference numeral 56 indicates a power cord whereby electric current is supplied for operating the contour probe. Power may be supplied from a standard 115 volt A.C. 60 cycle source, which may be utilized as such, or which may be converted to a pulsating direct current capable of being varied by the operator of the probe for obtaining certain test advantages, as will be explained.

It may here be noted that the adjustable jointed legs 22 and 24 enable the probe to conform to various irregular or odd-shaped surfaces of an object to be tested, and may be so adjusted as to perform tests upon contoured surfaces such as the inside or outside of a cylinder, around corners and offsets, and the like. Moreover, the span of the legs may be increased or decreased to obtain the most effective test possible under various conditions, and if desired, the legs may be locked at bolts 18, 20, 40, 40, for the performance of repeat tests on a series of identical parts or objects to be tested.

In its most desirable form, the probe of the invention may be provided with means for energizing coil 26 selectively, with A.C. (alternating current), or D.C. (direct current), the latter being variable to produce an exceptionally strong or an exceptionally weak magnetic field for testing. It is found that a strong A.C. field is desirable for certain types of inspection, or to demagnetize work which had retained unwanted residual magnetism. On the other hand, the pulsating D.C. type current may be more effectively employed where test objects may vary in size and mass, so that current of greater or lesser intensity, or leg spans of different amounts, may best be employed to obtain maximum test results. It is therefore desirable to build into housing 10, a compact lightweight means for selecting and varying the type and intensity of current which may be needed for effectively testing or inspecting work-pieces or objects having widely different characteristics.

Figure 9:
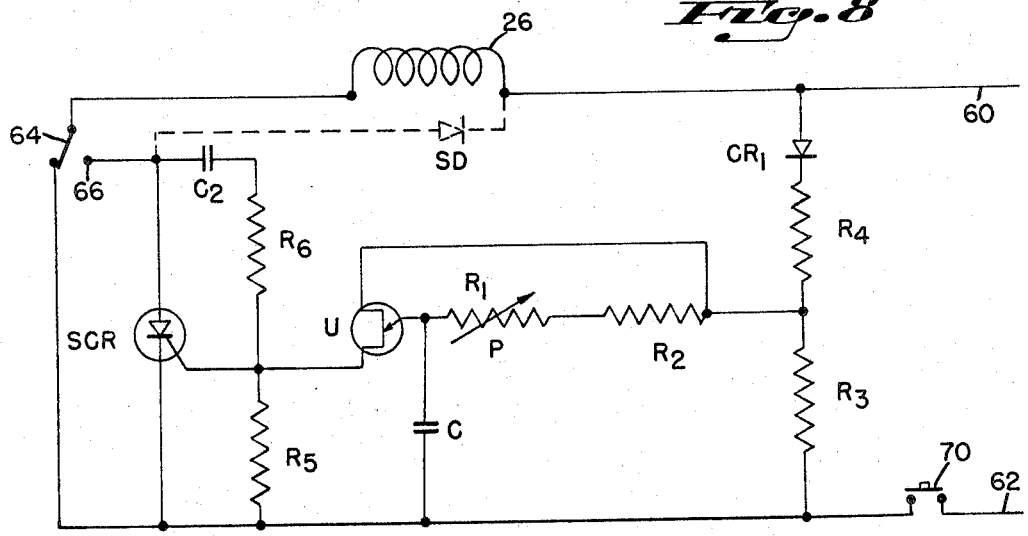
FIG. 9 is a schematic wiring diagram illustrating one arrangement of electrical components that may be built into the probe.

To use A.C. power, the magnetizing coil 26 may be simply connected across the 115 volt conductors 60 and 62 (FIG. 9) by means of a manual switch 64 mounted upon the housing. In the simplest form of the probe, core 26 may be so energized without resort to additional circuitry. The line voltage may vary from zero to 125 volts A.C. without damage to the coil, as long as the cycle frequency is about 50 cycles or higher. If the applied voltage be decreased, the magnetic field of coil 26 will be correspondingly reduced.

The current in the coil is limited principally by the inductance of the coil, resistance being deliberately reduced to a low value to avoid excessive heating of the coil. In use, the inductance will vary over a wide range as objects of different sizes are placed across the legs or pole pieces 22, 24, and removed therefrom. This condition will also cause the current to vary as the current is limited by the free air inductance to a fairly low value to prevent an operating condition which might damage the coil through overheating. In actual operation, current is further reduced by the presence of the iron core 28.

By flipping switch 64 to engage the contact 66, the A.C. supply may be terminated, and replaced by pulsating D.C. power to energize coil 26. The D.C. supply, by preference, avoids use of a transformer in order that all of the necessary circuitry might be built within housing 10, thereby eliminating the need for a heavy carrying case or separate power unit.

The foregoing advantage, amongst others, may be achieved by incorporating a silicon controlled rectifier SCR as a means of rectifying the A.C. to D.C., and utilizing the same rectifier in a switching function. The switching reduces the average current by allowing conduction for only a short period of each half cycle of the power frequency. A characteristic of the silicon controlled rectifier is that it will conduct only in one direction, and will conduct only after receiving a "gate" signal. When conduction has started, it acts somewhat as a switch and at the same time performs the rectifier function. However, the current through SCR must be limited by the external load, which is the coil 26.

Removal of the gate signal does not alter the SCR conducting; it is only after the current has dropped to a very low level and remains there for a short interval, that the conduction is shut off. The shut-off time interval is much shorter than the power frequency.

The "gate" pulse is provided by a unijunction transistor U, which has break-down characteristics that permit voltage to build up in condenser C to a critical potential when it begins to conduct heavily. The resulting current pulse is in turn passed to the gate input of the silicon controlled rectifier. Then, the unijunction conduction ceases as the current has decreased to a low value, and again the build-up begins in condenser C.

The rate of C/unijunction "build up" may be controlled by a potentiometer P, the control range being fixed by a limit resistor R2. The voltage source for charging condenser C is from the rectifier and voltage divider CR1, R4, and R5.

In operation, the time required to "fire" the unijunction U is always a much shorter interval than one cycle. Under a maximum output, rectifier SCR is never in conduction for more than one-third of the cycle to a minimum of a very small portion of one cycle which is selected from the right side or declining slope of the cycle. Limit resistor R2 is selected to prevent the rectifier SCR from being fired for more than one-third of the cycle. The value of potentiometer resistor R1 and other resistors to some extent may be varied for achieving maximum delay of firing.

The accumulated tolerance build-up of all affected components and resulting variations are designed to permit potentiometer P to function from an "off" condition, or almost nil, to the full rating achieved at the maximum of one-third of one cycle. Condenser C2 and resistor R6 function to suppress radio frequency interference.

As a possible modification of the circuitry, there is shown at SD by means of broken lines, a silicon diode connected between the anode of silicon controlled rectifier SCR, and one side of coil 26, thereby to shunt the coil. Incorporation of the silicon diode is found to have a desirable stabilizing influence upon the D.C. pulsations. In the typical circuit of FIG. 9, the various components may have values as follows:

R1—25K—1 w. pot. log 40% taper
R2—4700 ½ w. 5% resistor
R3—1200 ½ w. 5% resistor
R4—15K ½ w. 5% resistor
R5—120 ½ w. 5% resistor
R6—27 ½ w. 5% resistor
C—.5 mfd. 100 v. D.C. w. cap.
C2—.01 mfd. 1600 v. disc. cap.
U—2N1671A unijunction
SCR—Silicon controlled rectifier
CR1—500 ma.–400 P.I.V. silicon rectifier Switch 64 may be a single-pole double-throw switch of conventional type. Switch 70, if furnished, may be a single-pole single-throw push-button switch of conventional type. The values and types of components listed above may be varied within the skill of the electronics expert, without materially altering or depreciating the functions thereof, within acceptable limits.

In conclusion, it may be pointed out that the contour probe herein disclosed may find valuable application throughout the metal-working industry, to inspect raw materials, work in process, finished work, and the like. Application would include also the inspection of welds, ferrous castings, and parts requiring periodic checking while in service, examples of which may include cylinder blocks and heads, crank-shafts, and other vital machine components which might be expected to fail under continued or repeated working stress. In fact, the scope of application is almost without limit.

Another important use of the contour probe is in the field of non-destructive laboratory testing, to determine high level evaluation of critical defects, and to establish testing standards.

It is to be understood that various modifications and changes may be made in the device, within the scope of the appended claims, without departing from the spirit of the invention. Such modifications may include eliminating the direct-current circuitry in the interest of economy, but with an accompanying loss of service range; or, providing a substitute generator of direct current pulsation employing a transformer and current intensity controls, which have the obvious disadvantages of excessive weight and bulk such as to render impractical or impossible containment within the limits of the probe housing. Various other modifications and changes within the scope of the appended claims, may become manifest to persons skilled in the art to which the invention appertains.

I claim:

1. A portable magnetic device for revealing by magnetic particle orientation defects in ferrous objects, and comprising in combination: an elongate hollow nonferrous housing including a handle, and having a forward end and a rear end spaced apart; a hollow electrical magnetizing coil intermediate said spaced ends; an elongate magnetizable core supported by the housing and passing lengthwise through the hollow coil, said core having opposite ends disposed exteriorly of the coil; a pair of elongate magnetizable probe legs each having a free end and a mounting end; said legs each comprising an upper section, a lower section, and means pivoting the lower section to the upper section whereby said pivoted sections may be disposed angularly to one another; means adjacent to each end of the magnetizable core for pivotally supporting the mounting end of each probe leg; a first electric circuit within the housing for delivering alternating electric current to the said magnetizable coil; a second electric circuit within the housing including means therein for converting alternating electric current to a pulsating direct current and delivering pulsating direct current to said magnetizable coil, and electrical switch means on the housing handle connected in said circuits, for alternatively connecting the first and second electric circuits to a common source of alternating current for providing said magnetizing coil and its associated probe legs with an alternating magnetizing current from the first circuit, or with a pulsating direct magnetizing current from said second circuit.

2. The device as set forth in claim 1, wherein the combination includes adjustable rheostat in the second magnetizing circuit for varying and controlling the intensity of the pulsating direct current generated by said second circuit.

3. The combination set forth in claim 1, wherein the magnetizable core comprising a multiplicity of uniformly thin ferrous metal strips in flatwise contact, with alternate strips perforated and extended longitudinally to provide spaces therebetween; the upper sections of said probe legs comprising a multiplicity of uniformly thin ferrous metal strips in flatwise contact, with alternate strips thereof perforated and extended longitudinally to provide spaces therebetween at opposite ends of said sections, the perforated extensions of the core strips being received in the spaces between the perforated extensions at one end of the upper leg section strips, with the perforations thereof in registry; means extending through the registered perforations for pivotally securing the upper leg sections to opposite ends of the core; and the lower sections of said legs each comprising a multiplicity of uniformly thin ferrous strips in flatwise contact, with alternate strips thereof perforated and extended longitudinally at one end of each lower section to provide spaces therebetween receptive of the remaining perforated extensions of the upper leg section; and means extending through the perforations of the lower leg section extensions and the registered perforations of the extensions of said remaining perforated extensions of the upper leg section, for pivotally securing the lower sections to the upper sections of said probe legs.

4. A magnetic device for revealing by magnetic particle orientation defects in ferrous objects, and comprising in combination: an elongate hollow non-ferrous housing having a forward end and a rear end spaced apart; a hollow electrical magnetizing coil intermediate said spaced ends; a laminated, elongate magnetizable core supported by the housing and passing through the hollow coil, said core having opposite ends disposed exteriorly of the coil; a pair of laminated, elongate magnetizable probe legs each having a free end and a mounting end; means pivotally supporting the mounting end of each probe leg to an end of the magnetizable core; a first electric magnetizing circuit within the housing for delivering alternating electric current to said coil; a second electric magnetizing circuit within the housing including means therein for converting alternating electric current to a pulsating direct current and delivering pulsating direct current to said coil, and electrical switch means connected in said magnetizing circuits for selectively connecting one or the other of said circuits to a common source of alternating current for providing either alternating current magnetization or pulsating direct current magnetization to said probe legs.

5. The combination set forth in claim 4 including a manually operable, normally-open electrical switch in series circuit with each of the said magnetizing circuits and a common source of alternating current.

6. A portable magnetic device for revealing by magnetic particle orientation defects in ferrous objects, and comprising in combination: an elongate hollow non-ferrous housing including a handle, and having a forward end and rear end spaced apart; a hollow electrical magnetizing coil intermediate said spaced ends; an elongate magnetizable core supported by the housing and passing lengthwise through the hollow coil, said core having opposite ends disposed exteriorly of the coil; a pair of elongate magnetizable probe legs each having a free end and a mounting end; said legs each comprising an upper section, a lower section, and means pivoting the lower section to the upper section whereby said pivoted sections may be disposed angularly to one another; means adjacent to each end of the magnetizable core for pivotally supporting the mounting end of each probe leg; a first electric circuit within the housing for delivering alternating electric current to the said magnetizable coil; a second electric circuit within the housing including rectifier means for converting alternating electric current to a pulsating direct current and delivering pulsating direct current to said magnetizable coil, said second electric circuit including phase control switching means for turning the rectifier means on for not more than about ⅓ of a cycle selected from the declining slope of the cycle to obtain sharp pulses, and electrical switch means on the housing handle connected in said circuits, for alternatively connecting the first and second electric circuits to a common source of alternating current for providing said magnetizing coil and its associated probe legs with an alternating magnetizing current from the first circuit, or with a pulsating direct magnetizing current from said second circuit.

7. The device as set forth in claim 6, wherein the combination includes adjustable rheostat in the second magnetizing circuit for varying and controlling the intensity of the pulsating direct current generated by said second circuit.

8. The combination set forth in claim 6, wherein the magnetizable core comprising a multiplicity of uniformly thin ferrous metal strips in flat wise contact, with alternate strips perforated and extended longitudinally to provide spaces therebetween; the upper sections of said probe legs comprising a multiplicity of uniformly thin ferrous metal strips in flatwise contact, with alternate strips thereof perforated and extended longitudinally to provide spaces therebetween at opposite ends of said sections, the perforated extensions of the core strips being received in the spaces between the perforated extensions at one end of the upper leg section strips, with the perforations thereof in registry; means extending through the registered perforations for pivotally securing the upper leg sections to opposite ends of the core; and the lower sections of said legs each comprising a multiplicity of uniformly thin ferrous strips in flatwise contact, with alternate strips thereof perforated and extended longitudinally at one end of each lower section to provide spaces therebetween receptive of the remaining perforated extensions of the upper leg section; and means extending through the perforations of the lower leg section extensions and the registered perforations of the extensions of said remaining perforated extensions of the upper leg section, for pivotally securing the lower sections to the upper sections of said probe legs.

References Cited

UNITED STATES PATENTS

| | | | |
|---|---|---|---|
| 2,225,179 | 12/1940 | Oglevee | 324—38 |
| 2,337,148 | 12/1943 | Barnes | 324—37 |
| 2,722,636 | 11/1955 | Minchon | 324—38 |
| 2,832,922 | 4/1958 | De Forest | 324—38 |
| 3,146,396 | 8/1964 | Diperstein et al. | 324—38 |
| 3,233,170 | 2/1966 | Rogers | 324—37 |

FOREIGN PATENTS 497,095 12/1938 Great Britain.

OTHER REFERENCES

McMasters, Robert C.: Non-Destructive Testing Handbook, vol. II, p. 308, The Ronald Press Co., New York, N.Y., 1963.

RUDOLPH V. ROLINEC, *Primary Examiner.*

R. J. CORCORAN, *Assistant Examiner.*